No. 694,178. Patented Feb. 25, 1902.
J. W. NORMAN.
NUT LOCK.
(Application filed Dec. 30, 1901.)
(No Model.)

Witnesses
Inventor
J. W. Norman
By
Attorneys

UNITED STATES PATENT OFFICE.

JOHN W. NORMAN, OF DYERSBURG, TENNESSEE.

NUT-LOCK.

SPECIFICATION forming part of Letters Patent No. 694,178, dated February 25, 1902.

Application filed December 30, 1901. Serial No. 87,739. (No model.)

*To all whom it may concern:*

Be it known that I, JOHN W. NORMAN, a citizen of the United States, residing at Dyersburg, in the county of Dyer and State of Tennessee, have invented certain new and useful Improvements in Nut-Locks; and I do declare the following to be a full, clear, and exact description of the invention, such as will enable others skilled in the art to which it appertains to make and use the same.

The invention relates to nut-locks, and more particularly to that class of devices used for locking the joints of railroad-rails.

The object of the invention is to provide an improved form of nut-lock which shall be simple of construction, durable in use, comparatively inexpensive of production, easily applied, and which when in position will effectually prevent the accidental unscrewing of the nuts from their bolts.

With this and other objects in view the invention consists of certain novel features of construction, combination, and arrangement of parts, which will be hereinafter more fully described, and particularly pointed out in the appended claim.

Figure 1:
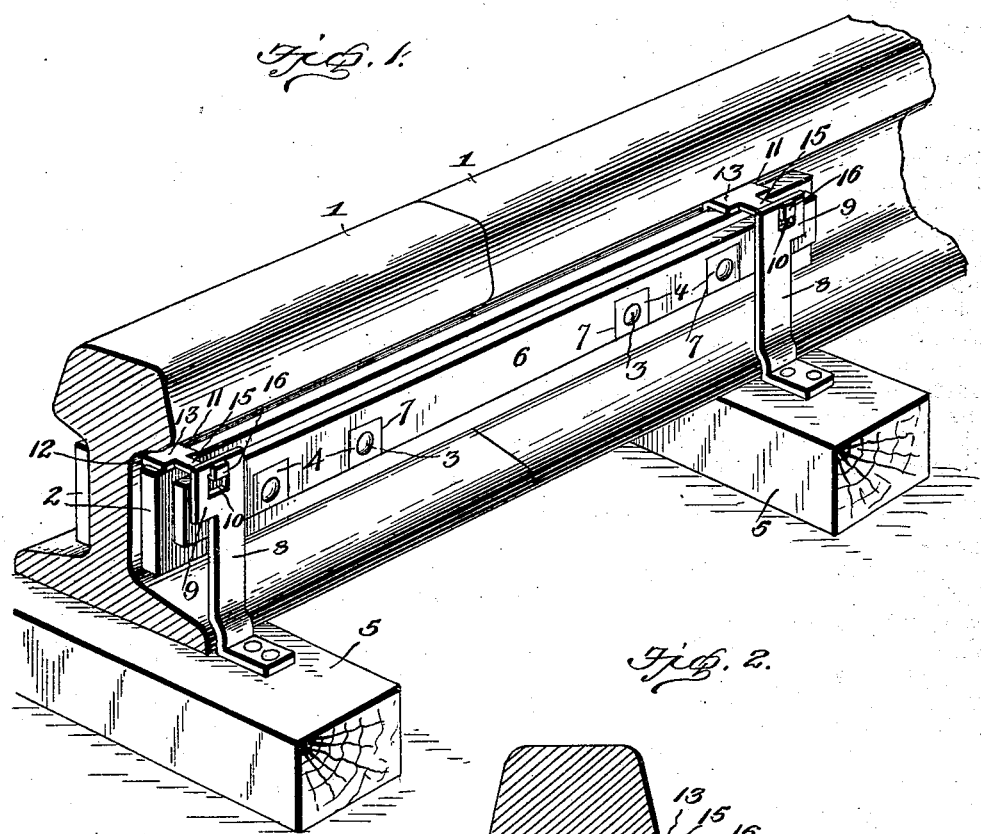
Figure 2:
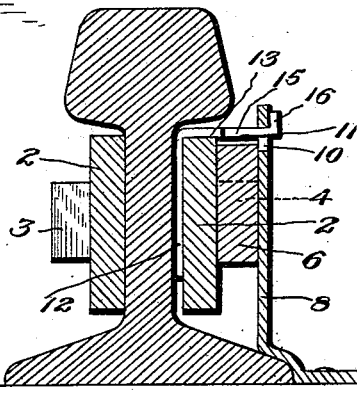

In the accompanying drawings, Figure 1 is a perspective view of the abutting ends of two railroad-rails, illustrating the application of the invention; and Fig. 2 is a vertical cross-sectional view.

Referring to the drawings, 1 and 2 denote the abutting ends of two railroad-rails; 2, the fish-plates or splice-bars; 3, the bolts; 4, the nuts, and 5 the ties. These parts may be of any well-known or approved construction, and further description of the same is not deemed necessary.

6 denotes the locking-bar, having recesses 7 formed in its lower edge to correspond to the nuts with which the bar is adapted to be engaged. It is evident that when the bar is engaged with the nuts said nuts will be prevented from being turned, and to provide means for holding this bar in position against displacement is the prime object of the invention. These means comprise angular knees 8, spiked or otherwise secured to the ties at their lower ends and provided at their upper ends with heads 9, formed with apertures 10.

11 denotes angle-plates, having their vertical portions 12 clamped between the outer fish-plate and the web of the rail by the bolts and nuts aforesaid and having their horizontally-extending portions 13 resting upon the upper edges of the fish-plates and provided with laterally-projecting tongues 15, which extend through the apertured head of the angle-knees and are provided with hooks 16, whereby the lock-bar is securely held in position.

If it be desired to remove the rails, this may be accomplished by first releasing the angle-knees, then withdrawing the angle-plates, thus permitting of the removal of the locking-bar and the unscrewing of the nuts.

From the foregoing description, taken in connection with the accompanying drawings, the construction, mode of operation, and advantages of the invention will be readily understood without requiring a more extended explanation.

Various changes in the form, proportion, and details of construction may be made within the scope of the invention without departing from the spirit or sacrificing any of the advantages thereof.

Having thus described my invention, what I claim, and desire to secure by Letters Patent, is—

In a nut-lock, the combination with the abutting ends of railroad-rails, fish-plates or splice-bars, and bolts and nuts, of a locking-bar having recesses in its lower edge to engage said nuts and prevent them from turning, an angle-knee adapted to be secured to the ties and provided with an apertured head, and an angle-plate clamped between the web of the rail and the splice-bar and provided with a laterally-projecting tongue which extends through the apertured head and is provided with an upturned end, substantially as set forth.

In testimony whereof I have hereunto set my hand in presence of two subscribing witnesses.

JOHN W. NORMAN.

Witnesses:
WILLIAM H. WORD,
JOSEPH J. HURT.